F. W. JOLITZ.
MEANS FOR COUPLING TRACTION ENGINES AND THRESHING MACHINES.
APPLICATION FILED SEPT. 5, 1908.
906,533.
Patented Dec. 15, 1908.
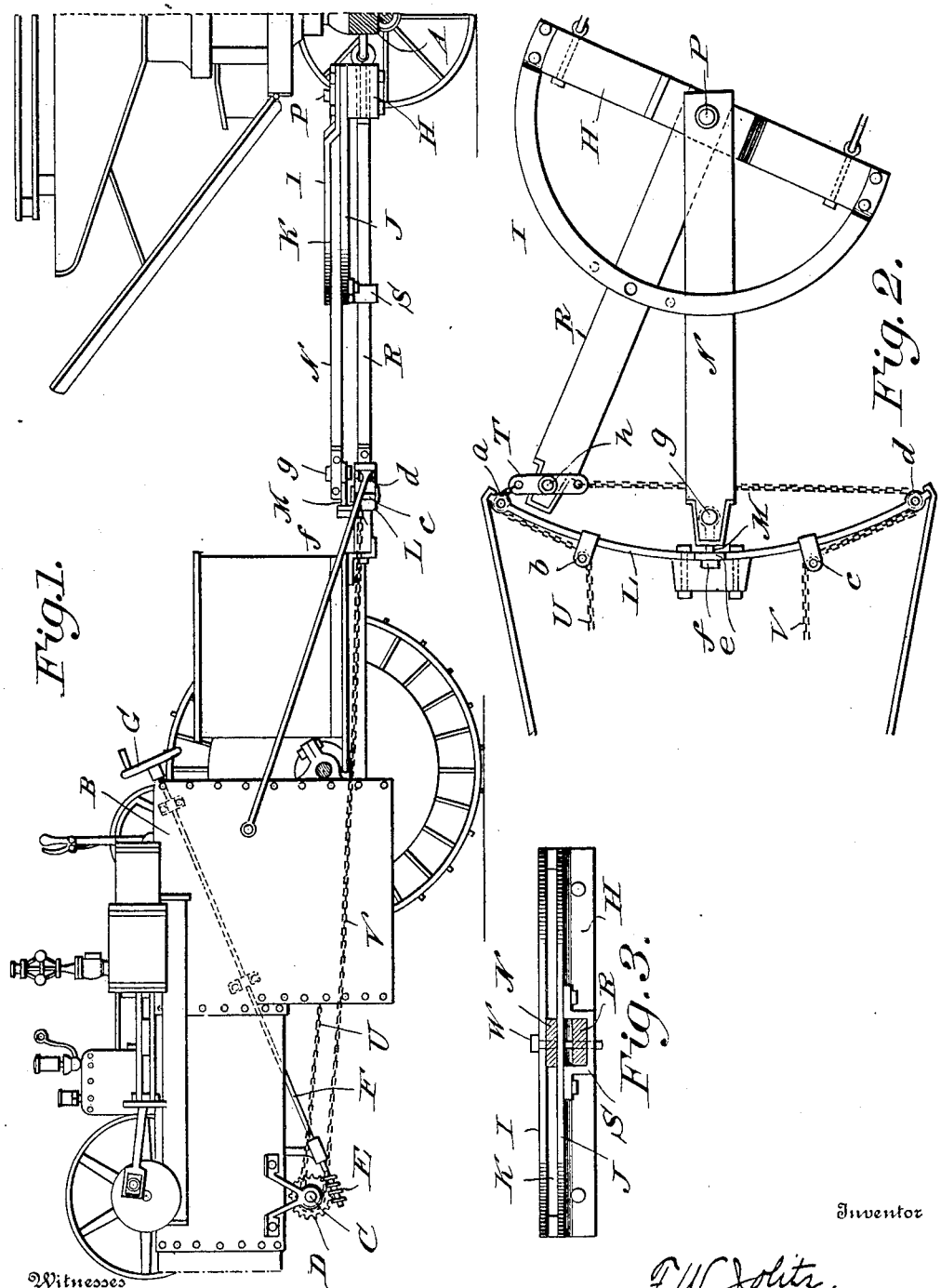

UNITED STATES PATENT OFFICE.

FREDRICK W. JOLITZ, OF NORTH FREEDOM, WISCONSIN.

MEANS FOR COUPLING TRACTION-ENGINES AND THRESHING-MACHINES.

No. 906,533.  Specification of Letters Patent.  Patented Dec. 15, 1908.

Application filed September 5, 1908. Serial No. 451,864.

*To all whom it may concern:*

Be it known that I, FREDRICK W. JOLITZ, a citizen of the United States, residing at North Freedom, in the county of Sauk and State of Wisconsin, have invented new and useful Improvements in Means for Coupling Traction-Engines and Threshing-Machines, of which the following is a specification.

My invention pertains to means for coupling traction engines and threshing machines and the like; and it has for its general object to provide intermediate a traction engine and a threshing machine, simple and inexpensive means through the medium of which an operator positioned on the traction engine is enabled to accurately guide the threshing machine when the traction engine is used to back said machine, and this with the expenditure of but a minimum amount of effort on the part of said operator.

With the foregoing in mind, the novelty, utility and practical advantages of the invention will be fully understood from the following specification and claim, when the same are read in connection with the drawings, accompanying and forming part of this specification, in which:

Figure 1 is a view showing portions of a traction engine and a threshing machine equipped with my improvements. Fig. 2 is a detail plan view illustrating portions of my novel coupling. Fig. 3 is a detail transverse section illustrating the longitudinal bars of my improvements.

Similar letters designate corresponding parts in all of the views of the drawings, referring to which:

A is the conventional front axle of a threshing machine.

B is a traction engine which may be and preferably is, in general, of the ordinary well known construction, but which obviously may be of any other construction consonant with the purpose of my invention without involving departure from the spirit of the same. At a suitable point the traction engine is provided with a transverse shaft C having fixed thereon a gear wheel D with which is intermeshed a worm screw E on a shaft F extending back to a point within convenient reach of the operator on the platform of the engine where it is equipped with a crank wheel G. By turning the said crank wheel G the said operator is obviously enabled to easily turn the shaft C in one direction or the other as occasion demands.

Arranged in front of and connected preferably, though not necessarily, in a detachable manner to the front axle A is a transverse beam H, and to the ends of the said beam are fixed the end portions of forwardly projecting, semi-circular bars I and J which are separated by an intervening space K, as best shown in Fig. 3.

Suitably connected in a fixed manner to the rear end of the engine B is a curvilinear bar L equipped with sheaves $a$, $b$, $c$ and $d$, and extending through a lug $e$ on the said curved bar L is a bolt M which is secured in the said lug by a nut $f$ or other suitable means and is pivotally connected at $g$ to a bar N. This bar N extends loosely through the space K between the semi-circular bars I and J and is connected by a pintle P with the center of the beam H, whereby it will be manifest that when the traction engine B is moved forward the bar N will draw the threshing machine after the engine; also, that the semi-circular bars I and J on the beam H are free to move in opposite directions crosswise of the said bar N for a purpose hereinafter set forth.

Connected through the pintle P with the beam H is the bar R through which the threshing machine is guided when said machine is backed by the engine B through the medium of the bar N. The said bar R is arranged in a strap S on the lower semi-circular bar J, or is otherwise fixed with respect to the bars I and J, and at a point adjacent to its forward end it is provided with a swinging link T which is pivoted to it at $h$. This swinging link T serves for the connection of cables U and V; the cable U being passed around the sheaves $a$ and $b$ in the order named and being wound in one direction on and connected to the shaft C, and the cable V being passed around the sheave $d$ and $c$, in the order named, and being wound in the opposite direction on and connected to said shaft C.

By virtue of the construction described it will be seen that an operator positioned on the platform of the engine B is enabled by turning the crank wheel G to turn the shaft C and in that way take up the cable U and pay off the cable V, or take up said cable V and pay off the cable U. From this it follows that incidental to the backing of the threshing machine through the medium of the engine and the bar N, the operator is enabled by moving the bar R in one direction or the other through the medium of the cables U and V to accurately guide the threshing machine and place the same in the position desired.

It is in some cases necessary to fix both the bars N and R with respect to the semi-circular bars I and J, and to this end I provide the removable pin W which as shown in Fig. 3 extends through the semi-circular bar I, the longitudinal bar N, the semi-circular bar J, the longitudinal bar R and the strap S, in the order named.

It will be gathered from the foregoing that my improvements enable an operator positioned on the platform of the engine B to quickly and with but little effort adjust the front axle A of the threshing machine during the backing of the said machine through the engine and the bar N.

The construction herein illustrated and described constitutes the best practical embodiment of my invention of which I am aware, but it is obvious that in the future practice of the invention such changes in the form, construction and relative arrangement of parts may be made as fairly fall within the scope of my invention as defined in the claim appended.

Having described my invention, what I claim and desire to secure by Letters-Patent, is:

The combination of a traction engine, a vehicle arranged in rear of the engine and having a pivoted front axle, a beam arranged in front of and connected at its ends with said axle, forwardly projecting, semi-circular bars fixed at their ends to the said beam and separated by an intervening space, a longitudinal bar extending through said space and pivotally connected with the beam, a bar fixed transversely on the rear portion of the engine and provided with sheaves, a connection between the longitudinal bar and the said transversely arranged bar, a second longitudinal bar connected to and arranged to move with the said semi-circular bars, a link pivoted on the forward portion of said second longitudinal bar, a shaft disposed transversely and supported on the engine and equipped with a gear wheel, a shaft journaled in bearings on the engine and extending from a point adjacent to the said transversely disposed shaft to the rear portion of the engine and having a worm screw intermeshed with the said gear wheel and also having a crank wheel, and cables connected with and extending in opposite directions from the link on the second named longitudinal bar and passed around the sheaves on the bar at the rear portion of the engine and wound in opposite directions on and connected with the said transversely disposed shaft.

In testimony whereof I have hereunto set my hand in presence of two subscribing witnesses.

FREDRICK W. JOLITZ.

Witnesses:
EVAN EVANS,
H. H. THOMAS.